United States Patent [19]

Teodorczyk

[11] Patent Number: 5,756,599
[45] Date of Patent: May 26, 1998

[54] BINDER RESIN, BINDER SYSTEM, CELLULOSIC COMPOSITE ARTICLES, AND METHOD OF MAKING THE SAME

[75] Inventor: Zygmunt Teodorczyk, San Jose, Calif.

[73] Assignee: Masonite Corporation, Chicago, Ill.

[21] Appl. No.: 888,878

[22] Filed: Jul. 7, 1997

Related U.S. Application Data

[60] Continuation-in-part of Ser. No. 480,431, Jun. 7, 1995, Pat. No. 5,646,219, which is a division of Ser. No. 447,839, May 23, 1995, Pat. No. 5,637,658, which is a continuation of Ser. No. 107,522, Aug. 17, 1993, abandoned.

[51] Int. Cl.$^6$ .......................... C08L 61/14; C08F 283/00; C08G 8/28
[52] U.S. Cl. .................... 525/491; 528/129; 528/142; 528/147; 528/155; 528/162; 528/232; 528/503; 525/480; 525/495; 525/497; 525/498; 525/504; 525/534; 428/524; 428/528
[58] Field of Search ............................ 528/129, 142, 528/147, 155, 162, 232, 503; 525/480, 491, 504, 495, 534, 497, 498; 428/524, 528

[56] References Cited

U.S. PATENT DOCUMENTS

| | | | |
|---|---|---|---|
| Re. 26,881 | 5/1970 | Kreibich et al. | 260/52 |
| 2,471,631 | 5/1949 | Lebach | 525/491 |
| 2,489,336 | 11/1949 | Spahr et al. | 528/155 |
| 2,614,096 | 10/1952 | Spahr | 526/590 |
| 3,328,354 | 6/1967 | Dietrick | 526/59 |
| 3,389,125 | 6/1968 | Dietrick et al. | 528/140 |
| 3,422,068 | 1/1969 | Kreibich et al. | 528/140 |
| 3,476,706 | 11/1969 | Bornstein | 528/146 |
| 3,492,263 | 1/1970 | Kreibich et al. | 524/541 |
| 3,502,610 | 3/1970 | Thompson | 524/650 |
| 3,663,720 | 5/1972 | Thompson | 428/268 |
| 3,706,619 | 12/1972 | Freeman | 156/315 |
| 3,919,151 | 11/1975 | Moult et al. | 524/594 |
| 3,963,652 | 6/1976 | Tanimura et al. | 525/135 |
| 4,007,233 | 2/1977 | Kako et al. | 525/135 |
| 4,053,447 | 10/1977 | Shea | 524/594 |
| 4,076,873 | 2/1978 | Shea | 428/35 |
| 4,107,127 | 8/1978 | Shea | 523/222 |
| 4,167,540 | 9/1979 | Giller et al. | 525/135 |
| 4,238,379 | 12/1980 | Reinhart, Jr. | 524/100 |
| 4,275,170 | 6/1981 | McAllister et al. | 521/103 |
| 4,309,527 | 1/1982 | McAllister et al. | 528/138 |
| 4,373,062 | 2/1983 | Brown | 524/841 |
| 4,403,066 | 9/1983 | Brode et al. | 524/876 |
| 4,409,361 | 10/1983 | McAllister et al. | 524/876 |
| 4,425,178 | 1/1984 | Grendon | 156/307.3 |
| 4,430,473 | 2/1984 | Brode et al. | 524/492 |
| 4,433,119 | 2/1984 | Brode et al. | 525/442 |
| 4,433,129 | 2/1984 | Brode et al. | 528/154 |
| 4,471,089 | 9/1984 | McAllister et al. | 524/847 |
| 4,514,462 | 4/1985 | Brooker | 428/285 |
| 4,608,408 | 8/1986 | Hood et al. | 524/15 |
| 4,820,576 | 4/1989 | Duryea | 428/246 |
| 4,889,891 | 12/1989 | Durairaj et al. | 525/139 |
| 5,034,497 | 7/1991 | Waitkus | 528/129 |
| 5,075,413 | 12/1991 | Dailey, Jr. | 528/129 |
| 5,075,415 | 12/1991 | Yotsumoto et al. | 528/149 |

FOREIGN PATENT DOCUMENTS

| | | |
|---|---|---|
| 0 298 704 | 1/1989 | European Pat. Off. |
| 456816 | 2/1975 | U.S.S.R. |
| 483419 | 4/1976 | U.S.S.R. |
| 516704 | 10/1977 | U.S.S.R. |
| 1470750 | 4/1989 | U.S.S.R. |
| 1295829 | 11/1972 | United Kingdom |
| 1496703 | 12/1977 | United Kingdom |
| 2040971 | 9/1980 | United Kingdom |
| 1593933 | 7/1981 | United Kingdom |
| 2100274 | 12/1982 | United Kingdom |

OTHER PUBLICATIONS

P. Christjanson, "Development of Alkylresorcinol (AR) Resin Adhesives: Chemistry of AR Resins," Proceedings from the Adhesives and Bonded Wood Symposium, Nov. 19–21, 1991, pp. 267–277.

A. Pizzi, *Wood Adhesives*, "Phenolic Resin Wood Adhesives," 1983, p. 140.

Hawley's Condensed Chemical Dictionary, Eleventh Edition, 1987, pp. 536–537 and 914–915.

K. Walter, "Steam Pressing Experience from Operating Plants and Future Possibilities," pp. 79–91.

*Primary Examiner*—Samuel A. Acquah
*Attorney, Agent, or Firm*—Marshall, O'Toole, Gerstein, Murray & Borun

[57] ABSTRACT

A process for producing a phenol-aldehyde (e.g., cresol-aldehyde) resin that is modified with a dihydroxybenzene compound. The resin may form a binder system when combined with a curing agent which includes an additional source of an aldehyde. The resin and adhesive are useful in the production of wood composite articles by a steam injection process.

28 Claims, No Drawings

BINDER RESIN, BINDER SYSTEM, CELLULOSIC COMPOSITE ARTICLES, AND METHOD OF MAKING THE SAME

CROSS REFERENCE TO RELATED APPLICATIONS

This is a continuation-in-part of U.S. application Ser. No. 08/480,431 filed Jun. 7, 1995, now U.S. Pat. No. 5,646,219 issued Jul. 8, 1997; which is a division of U.S. application Ser. No. 08/447,839 filed May 23, 1995, now U.S. Pat. No. 5,637,658 issued Jun. 10, 1997; which is a continuation of U.S. application Ser. No. 08/107,522 filed Aug. 17, 1993, now abandoned.

BACKGROUND OF THE INVENTION

1. Field of the Invention

The invention relates generally to modified phenol-formaldehyde resins, and more particularly to the use of such resins as binders in processes for the production of cellulosic composites. The invention also relates to the production of cellulosic composite articles with a steam injection process.

2. Description of Related Technology

Synthetic resins, such as phenol-formaldehyde resins, are often used as binders in the manufacture of composite articles such as man-made pressed boards (e.g., waferboard, oriented strandboard ("OSB"), or fiberboard). Such composites may be formed in desired shapes and sizes depending on the intended use. Various processes may be used to produce cellulosic (e.g., wood) composites depending on the desired final product. Fiberboard, for example, may be made by various known processes including "dry" processes (e.g., a process comprising application of resin to a filler material by a blender or by a blowline application), "wet" processes, or "wet-dry" processes. Various phenol-formaldehyde resins may also be utilized as binders in the manufacture of other wood composites such as plywood.

Several useful processes are described (for example, for the production of plywood and fiberboard) in U.S. Pat. No. 4,961,795. Other processes are described in U.S. Pat. No. 5,367,040. The respective disclosures of these patents are hereby incorporated herein by reference.

Steam injection pressing is a process that can be used in the manufacture of cellulosic composites. In steam injection pressing, during an injection period, steam flows into, through, and then out of a mat that includes a filler material and a binder. The heat transferred by the steam causes the binder resin to cure. When compared with conventional panel pressing, steam injection pressing may provide the advantages of providing a more rapid cure of thicker panels and products having more uniform densities. However, the use of known phenol-formaldehyde resins in steam injection pressing systems often produces poor results, such as poor bond formation.

It would therefore be desirable to produce a resin (and more particularly a phenolic resin) suitable for use with steam injection processing, and particularly a resin that has a relatively fast cure time. In addition, it would be desirable to produce a binder system in which undesirable amounts of formaldehyde will not be released into the atmosphere upon pressing. It would still further be desirable to produce a binder system that is convenient to use in a process such as the those described above.

SUMMARY OF THE INVENTION

It is an object of the invention to overcome one or more of the problems described above.

Accordingly, the invention provides a process for producing a modified phenol-aldehyde resin (e.g., a phenol-formaldehyde resin). The phenol component, preferably a cresol, is reacted with an aldehyde in the presence of an alkaline catalyst, followed by reaction with a dihydroxybenzene compound.

According to one feature of the invention, the inventive modified phenol-aldehyde resin is combined with a source of aldehyde to form a binder system.

In a further embodiment of the invention, the modified phenol-aldehyde resin is combined with cellulosic material to form a mat. Steam is injected into the mat, as by a steam injection process, to transfer heat to the mat so as to cure the resin.

Other objects and advantages of the invention will be apparent to those skilled in the art from the following detailed description, taken in conjunction with the appended claims.

DETAILED DESCRIPTION OF THE INVENTION

Generally, according to one embodiment of the invention, a modified phenol-aldehyde resin is produced by first condensing a phenol and an aldehyde in the presence of an alkaline catalyst. The condensation product of phenol and the aldehyde is then further condensed with a dihydroxybenzene modifier.

In order to produce a preferred resin useful in conjunction with a steam injection pressing process, a cresol (preferably m-cresol, but optionally o-cresol, p-cresol, cresylic acid, or mixtures thereof) is preferably selected for the initial reaction with the aldehyde. In this embodiment, the phenol component of the initial reaction may consist essentially of, or may consist of, a cresol.

The reference herein to "phenol" denotes phenol derivatives (e.g., substituted phenols), as well as phenol itself (i.e., hydroxybenzene). Although m-cresol is preferably utilized in order to produce a resin that is fast curing, other substituted phenols can be employed in the formation of the phenol-aldehyde prepolymer. Such useful phenols include other substituted phenols such as xylenols, including mixtures thereof.

According to one embodiment of the invention cresylic acid is used as the phenol component. Cresylic acid may include, for example, a mixture of cresols, xylenols, and $C_9$ phenols. A mixture of cresylic acid and cresol may also be used.

Similarly, the formaldehyde component of the inventive resin is not limited to formaldehyde itself, but encompasses any formaldehyde derivative and other aldehydes or derivatives thereof which are known in the art to be useful in conjunction with phenolic resins. Derivatives of formaldehyde include, for example, paraformaldehyde, hexamethylenetetramine, acetaldehyde, glyoxal, and furaldehyde. However, formaldehyde is the preferred aldehyde. Thus, when the formaldehyde component of the resin is referred to herein, this refers to formaldehyde, formaldehyde derivatives, and other aldehydes.

The above-described initial condensation reaction preferably takes place at a temperature in a range of about 50° C. to about 65° C. in the presence of an alkaline catalyst (e.g., caustic) to achieve methylolation of phenol. Various useful catalysts are known in the art, and include, for example, sodium hydroxide (caustic) or potassium hydroxide.

The ratio of aldehyde to phenol (e.g., m-cresol) in the aforementioned reaction is preferably in a range of about 1.2 moles to about 2.0 moles aldehyde per mole phenol, more preferably about 1.3 moles to about 1.6 moles aldehyde per mole phenol, and most preferably about 1.4 moles aldehyde per mole phenol. If a bifunctional phenolic compound is utilized in place of m-cresol, the equivalent molar ratio, or "EMR" (the ratio of moles formaldehyde to the number of free positions on the phenolic ring available for reaction with formaldehyde), is preferably in a range of about 0.4:1 to about 0.66:1. An EMR of 0.4 for m-cresol corresponds to a standard molar ratio of about 1.2:1.

Although higher levels of caustic may be utilized, caustic is preferably added to the reaction mixture at about 0.1 moles to about 0.2 moles sodium hydroxide per mole of phenol. Such an amount of caustic generally assures very beneficial wet properties of the cellulosic composites product (e.g., tolerance to moisture), while allowing for sufficiently rapid cure in manufacturing. More caustic can be used to accelerate the resin cure process; however, a high caustic content may result in undesirable properties in the final product, including higher water absorption rates and thickness swell of the final wood composite product.

Following the condensation reaction between m-cresol and formaldehyde, the reactor is preferably heated to a temperature in a range of about 80° C. to about 90° C. and held at this temperature to obtain a polymer of desired chain length. This initial condensation product may be referred to as a "PF pre-polymer."

An amount of a dihydroxybenzene modifier (e.g., resorcinol) is added to this initial condensation product. Examples of dihydroxybenzenes include resorcinol, hydroquinone, and catechol. Unsubstituted and substituted resorcinols, including mixtures thereof, can be used. This reaction is continued, preferably without the addition of further caustic, until a desired chain length is reached, to produce what may be referred to as a "PRF pre-polymer" or "PRF resin." The inventive resin is also referred to herein as a modified phenol-formaldehyde resin.

Though resorcinol is the preferred modifier compound, other modifier compounds that may be reacted with the phenol-formaldehyde pre-polymer include aminophenols and phenylenediamines. Examples of aminophenols include ortho-hydroxyaniline, meta-hydroxyaniline, and para-hydroxyaniline. Examples of phenylenediamines include ortho-phenylenediamine, meta-phenylenediamine, and para-phenylenediamine.

The above-described sequential condensation reactions preferably use a molar ratio of phenol (e.g., m-cresol) to resorcinol in a range of about 1 mole to about 10 moles phenol per mole resorcinol, and more preferably about 5 moles to about 10 moles phenol per mole resorcinol.

The molar ratio of aldehyde to total phenolic compounds (i.e., the phenol plus resorcinol modifier) is preferably greater than about 1:1. More preferably, the ratio of aldehyde to total phenolics is in a range of about 1 mole to about 1.8 moles formaldehyde per mole phenolics, even more preferably about 1.1 mole to about 1.4 moles formaldehyde per mole phenolics, and most preferably about 1.2 moles formaldehyde per mole phenolics. Thus, the inventive process produces a resole resin, as opposed to a novolac resin.

Following the condensation of resorcinol (or one of the other suitable compounds described above), the reaction vessel is preferably cooled to ambient temperature for storage. The product resin, which may be referred to as a "PRF resin," is generally stable at ambient temperature for at least one month. The inventive PRF resin is preferably utilized in conjunction with a curing agent (described herein) as a binder system in the manufacture of cellulosic composite articles such as waferboard, fiberboard (e.g., medium density fiberboard or hardboard), oriented strandboard, plywood, and particleboard, including composites thereof (e.g. a multi-layer article having a first layer of OSB and an overlay of fiberboard). In the binder system, the inventive resin advantageously exhibits very fast cure and low water tolerance.

As is known in the art, a variety of modifiers may be incorporated into the resin in order to modify its properties. These modifiers include, for example: urea, melamine, lignins, tannins, sugars, starches, glycols, polyols, and mixtures thereof. The proportion of modifier incorporated into the resin typically ranges from about 5 weight percent to about 35 weight percent based upon the phenolic component.

The inventive resin can preferably be used in the production of a cellulosic composite article by steam injection processing. In the steam injection process, the inventive modified phenol-aldehyde resin is combined with cellulosic material and, optionally, a curing agent to form a mat. Preferably, a dry process is utilized and produces a mat having a moisture content of less than about 10 weight percent, more preferably less than about 8 weight percent, and most preferably less than about 6 weight percent.

The mat is placed in a suitable pressing apparatus. Saturated steam is injected into the mat to transfer heat and moisture into the mat so as to cure the resin. The pressure in the press is preferably in a range of about 100 psig to about 400 psig, and more preferably in a range of about 200 psig to about 300 psig. The temperature of the steam is preferably in a range of about 150° C. to about 200° C., while the press platens are preferably at a temperature in a range of about 150° C. to about 210° C. Press times generally are relatively short, and are preferably in a range of about 15 seconds to about 5 minutes, and more preferably about 30 seconds. However, these parameters are variable depending upon the materials and apparatus being utilized.

As will be apparent to those of ordinary skill in the art, desirable pressing temperatures vary according to various factors, including the following: the thickness of the board, the type of cellulosic material being pressed, the moisture content of the cellulosic material, the press time, and the type of resin which is utilized. The moisture content of the cellulosic material (known as "furnish moisture content") is one factor which controls the core temperature of the mat which can be achieved under given press conditions. Because the inventive resin system is very fast curing, one resulting advantage is that the binder system is able to be cured at lower core temperatures than fast curing phenol-formaldehyde resins at a given furnish moisture content, or at a furnish higher moisture content at a given press temperature.

Steam injection processes and apparatus are described in Walter, "Steam Pressing Experience from Operating Plants and Future Possibilities" (G. Siempelkamp Gmbh and Co.) and U.S. Pat. Nos. 5,195,428; 5,134,023; and 4,850,849, the respective disclosures of which are hereby incorporated herein by reference.

As stated above, the use of phenolic resins in steam injection pressing systems have in the past produced poor results and poor bond formation. It has been determined that the poor results may be attributed to various factors such as precure of the resin, moisture retardation, and starved glue lines caused by excess resin penetration into the mat. (Moisture retardation is observed where moisture in the core prevents the temperatures from rising rapidly over 100° C. due to the evaporation of water.) The invention solves these problems by providing a resin possessing a capability for fast cure under high moisture conditions while having low water tolerance (i.e., low water solubility). The water tolerance of the inventive resins advantageously is preferably less than about 300%, and more preferably less than about 100%, for example in a range of about 20% to 100%.

It has been found that resins exhibiting low water tolerance will advantageously precipitate on the furnish upon injection of the steam. Once the resin is precipitated, it will not "wash out" from the glueline (i.e., the precipitated resin will remain in contact with the fiber or flake furnish). This will also reduce or prevent overpenetration of the resin into the mat, another problem that has been encountered.

Alternatively, the PRF resins produced by the above-described process may be utilized in a process that utilizes a conventional hot press. For most applications, the press temperature is generally between about 200° F. (about 93° C.) and 500° F. (about 260° C.), and preferably greater than 300° F. (about 149° C.).

Although the resin may be cured by itself at high temperatures in the aforementioned processes, the cure rate of the resin is preferably accelerated by addition to the PRF resin of a source of further formaldehyde or other aldehyde. Any source of formaldehyde or other aldehyde may be used to accelerate the cure of the PRF resin. For example, the inventive PRF resin preferably is able to be cured while using an additional source of aldehyde in press cycles not longer than those typically observed for isocyanate resins, while at the same time the inventive resin yields a substrate with better weatherability properties.

According to a preferred embodiment of the invention, an organic resin comprising formaldehyde (e.g., a fast-curing phenol-formaldehyde resin or a "PF resin") is utilized as the curing agent. Any organic resin comprising formaldehyde, a formaldehyde derivative, or other aldehydes may be utilized. When using a PF resin as the curing agent, the weight proportion of the PRF resin to PF resin is preferably in a range of about 0.25:1 to about 4:1, and more preferably in a range of about 0.6:1 to about 1.5:1. PF resins known in the art as binders in wood composites may be suitably utilized as the source of further formaldehyde. For example, a PF resin having a molar ratio of formaldehyde to phenol in a range of about 2 moles to about 3 moles formaldehyde per mole phenol, and more preferably about 2.4 moles formaldehyde per mole phenol is useful with the invention. Where the source of further formaldehyde is a phenol-formaldehyde resin, the total resulting ratio of phenol to resorcinol (in the complete binder system) is preferably at least about 10 moles phenol per mole resorcinol. In addition, the total molar ratio of formaldehyde to phenol in the complete binder system may be about 1.8 moles formaldehyde per mole phenol.

The use of the above-described resins as curing agents (a commercially available phenol-formaldehyde resin) is beneficial not only because the PF resin functions as a curing agent, but because the PF resin contributes on its own as a binding agent. Because the PF resin is a binding agent, this provides a further advantage in that the PF resin preferably reduces the overall cost of the binder system due to the lower cost of phenol-formaldehyde resins.

In addition to phenol-formaldehyde resins, urea-formaldehyde or melamine-formaldehyde resins may be utilized as curing agents with the invention. Alternatively (although less preferably), the curing agent may be hexamethylenetetramine or paraformaldehyde. Further, combinations of any of the above-described curing agents may also be utilized.

The mixture of the commercial phenolic resin and the inventive resin is also advantageously stable at ambient temperature for several hours, facilitating use of the binder system in commercial operations.

The produced resin may be stored as an aqueous liquid. If the resin is to be stored as an aqueous liquid, the resin is preferably not mixed with the phenol-formaldehyde curing agent until immediately prior to use in the manufacturing process, because such a mixture is not stable and might result in undesirable curing of the resin. However, if the resin is to be stored as a powder, the resin can be mixed with the phenol-formaldehyde curing agent immediately prior to the spray-drying (wherein the liquid form of the resin is made into a powder form). Although not necessary, both liquids (PRF and PF) may be mixed in-line immediately prior to blending with the cellulosic material, or to spray-drier. They may be also mixed in a separate tank before spray-drying or addition to cellulosic material. Such liquid mixture of PRF and PF curing resin is stable for several hours.

The PRF resin and the source of further formaldehyde may be applied as a two-component binder system. However, the PRF resin in combination with a PF resin (as a curing agent) can be easily spray-dried by a process known in the art and used as a one-component system.

According to a particularly preferred embodiment of the invention, m-cresol, caustic, and water are first combined in a reaction vessel in the amounts shown in Table I. The ingredients are mixed, and the mixture is heated to about 55° C. Formaldehyde is added at about 55° C. over a period of 40 minutes. The mixture is held at about 55° C. for about 30 minutes.

The temperature of the reactants is then allowed to increase stepwise until the temperature reaches about 80° C. The reaction mixture may be heated, if necessary, to reach this temperature. The temperature of the reaction is then preferably held at about 80° C. until the mixture reaches a desired water tolerance. Most preferably, the mixture is held at 80° C. until 100% water tolerance is achieved, following which resorcinol is added in the amount indicated in Table I. Water tolerance can be measured in known manners. The reaction mixture need not be cooled prior to the addition of the modifier, e.g., resorcinol; such cooling is necessary in many prior art processes, for example, those processes disclosed in U.S. Pat. Nos. 2,489,336 and 2,614,096.

The batch is then held at 80° C. until it reaches a water tolerance of about 30% to about 60%. At this point, the batch is then cooled rapidly to about 25° C. for storage.

Alternatively, the initial reaction mixture may be held at the indicated temperature until it is measured to have a viscosity of about "B"–"C", as defined by the Gardner viscosity scale. When the reaction mixture attains this viscosity, resorcinol is added to the reactor, which is held at about 85° C. until the reactants attain the viscosity of about "E"–"F." Once the reaction mixture has reached this viscosity, the batch is cooled as fast as possible to about 25° C.

The desired temperatures of the reaction mixture vary depending upon the phenolic compound selected. For m-cresol, the temperature is preferably held lower due to the higher reactivity of m-cresol when compared to phenol itself. Since o-cresol and p-cresol are less reactive, the temperatures can be higher, for example in a range of about 65° C. to about 70° C. during methylolation and in a range of about 90° C. to about 95° C. during the second condensation reaction with the modifier.

A particular preferred resin formulation which may be used in the preceding example is shown in Table I below.

TABLE I

| Reactant | Weight Percent (Based on Total Ingredients) | Concentration of Solution |
|---|---|---|
| m-Cresol | 34.84 | 50 wt. % |
| Formaldehyde solution | 27.10 | |
| Water | 28.38 | |
| Caustic soda solution | 2.58 | 50 wt. % |
| Resorcinol | 7.10 | |
| Total | 100.00 | |

A resin produced in accordance with the example described above preferably has the properties outlined in Table II.

TABLE II

| Property | Value |
|---|---|
| Non-volatiles | 49.0–51.0 wt. % |
| Viscosity | 75–150 cps |
| Water Tolerance | 20%–100% |
| Gel Time @ 100° C. | >60 min. |
| Spec. Grav. @ 20° C. | about 1.15 g/mL |
| Free Formaldehyde | none |

Boiling Water Gel Time ("BWGT"), which can be used as an indicator of resin activity, helps illustrate the effectiveness of one binder system. A higher BWGT indicates a lower reactivity. A PRF resin prepared utilizing phenol in the initial PF prepolymer generally will have a BWGT of greater than 60 minutes. In comparison, a fast curing phenol-formaldehyde resin used as the curing agent for the inventive PRF resin has a BWGT of about 23 minutes. However, when used in combination (i.e., where the PF resin is the curing agent for a PRF resin), at a weight ratio of about 1:1, the inventive binder system may have a BWGT of about 6 to about 10 minutes.

Other properties (such as water absorption, thickness swell, one hour boil caliper swell) are much better for this binder system, even at the shorter press times, than for known phenol-formaldehyde resins.

The foregoing detailed description is given for clearness of understanding only, and no unnecessary limitations should be understood therefrom, as modifications within the scope of the invention will be apparent to those skilled in the art.

I claim:

1. A method of preparing a modified phenol-aldehyde resin, comprising the steps of:

(a) reacting a phenolic component comprising a cresol with an aldehyde at a molar ratio of aldehyde to phenolic component of about 1.2:1 to about 2.0:1, in the presence of an alkaline catalyst present in an amount of about 0.1 to about 0.2 moles catalyst per mole of said phenolic component; and (b) reacting a modifier comprising a dihydroxybenzene compound with the product of step (a) wherein the molar ratio of said aldehyde to the total of said phenolic component and said modifier is greater than about 1:1.

2. The method of claim 1 wherein:
   said phenolic component comprises m-cresol.

3. The method of claim 1 wherein:
   said cresol consists essentially of m-cresol.

4. The method of claim 1 wherein:
   said phenolic component comprises cresylic acid.

5. The method of claim 1 wherein:
   said modifier comprises resorcinol.

6. The method of claim 1 wherein:
   said molar ratio of said aldehyde to the total of said phenolic component and said modifier is in a range of about 1:1 to about 1.8:1.

7. The method of claim 1 wherein:
   said molar ratio of said aldehyde to the total of said phenolic component and said modifier is in a range of about 1:1 to about 1.4:1.

8. The method of claim 1 wherein:
   said molar ratio of aldehyde to said phenolic component is in a range of about 1.3:1 to about 1.6:1.

9. The method of claim 1 wherein:
   the molar ratio of said phenolic component to said modifier is in a range of about 1:1 to about 10:1.

10. The method of claim 1 wherein:
    said molar ratio of said phenolic component to said modifier is in a range of about 5:1 to about 10:1.

11. A method of preparing a modified phenol-aldehyde resin, comprising the steps of:

(a) reacting a phenolic component comprising a cresol with an aldehyde at a molar ratio of aldehyde to phenolic component of about 1.2:1 to about 2.0:1, in the presence of an alkaline catalyst; and (b) reacting a modifier comprising a dihydroxybenzene compound with the product of step (a) wherein the molar ratio of said aldehyde to the total of said phenolic component and said modifier is greater than about 1:1.

12. The method of claim 11 wherein:
    said phenolic component comprises m-cresol.

13. The method of claim 11 wherein:
    said catalyst is present in an amount of about 0.1 to about 0.2 moles catalyst per mole of said phenolic component.

14. A resin made by the method of any one of claims 1–13.

15. The method of claim 1, further comprising the step of:
    combining said modified phenol-aldehyde resin with a curing agent comprising a source of an aldehyde to provide a binder system.

16. The method of claim 15 wherein:
    said curing agent is selected from the group consisting of phenol-formaldehyde resins, urea-formaldehyde resins, melamine-formaldehyde resins, hexamethylenetetramine, formaldehyde and paraformaldehyde.

17. The method of claim 15 wherein:
    said curing agent comprises a phenol-formaldehyde resin.

18. The method of claim 17 wherein:
    the weight ratio of said phenol-aldehyde resin to said modified phenol-aldehyde resin is in a range of about 0.25:1 to about 4.0:1.

19. A binder system made by the method of any one of claims 15–18.

20. A method of preparing a cellulosic composite article, comprising the steps of:

(a) reacting a phenolic compound comprising a phenol or a phenol derivative and an aldehyde at a molar ratio of aldehyde to phenolic compound of about 1.2:1 to about 2.0:1, in the presence of an alkaline catalyst;

(b) reacting a modifier comprising a dihydroxybenzene with the product of step (a), wherein the molar ratio of said aldehyde to the total of said phenolic compound and said modifier is about 1:1 or greater, to produce a modified phenolic resin;

(c) combining said modified phenolic resin with a cellulosic filler to form a mat;

(d) consolidating said mat under heat and pressure in a pressing apparatus; and (e) providing steam to said mat in said apparatus during said step (d).

21. The method of claim 20 wherein:
said phenolic compound comprises a cresol.

22. The method of claim 21 wherein:
said cresol is m-cresol.

23. The method of claim 20 wherein:
said catalyst is present in an amount of about 0.1 to about 0.2 moles catalyst per mole of said phenolic compound.

24. The method of claim 20 wherein:
the molar ratio of phenolic compound to modifier is in a range of about 1:1 to about 10:1.

25. A method of producing a cellulosic composite, comprising the steps of:

(a) reacting a cresol and an aldehyde in the presence of an alkaline catalyst;

(b) reacting a modifier comprising a dihydroxybenzene compound with the product of step (a) to form a modified phenol-aldehyde resin;

(c) combining said modified phenol-aldehyde resin with a curing agent which comprises an organic resin comprising an aldehyde to form a binder system;

(d) combining said binder system with a cellulosic filler;

(e) forming the product of step (d) into a mat; and (f) pressing said mat under heat to form a wood composite; and (g) providing steam to said mat in said apparatus during said step (f).

26. The method of claim 25 wherein:
said cresol is m-cresol.

27. The method of claim 25 wherein:
said mat has a moisture content of less than about 10 wt. %.

28. A cellulosic composite made by the method of any of claims 25–27.

* * * * *